US008725712B2

(12) United States Patent
Arrasvuori (10) Patent No.: US 8,725,712 B2
(45) Date of Patent: May 13, 2014

(54) CONTEXT BASED MEDIA CONTENT PRESENTATION

(75) Inventor: Juha Henrik Arrasvuori, Tampere (FI)

(73) Assignee: Nokia Corporation, Espoo (FI)

( * ) Notice: Subject to any disclaimer, the term of this patent is extended or adjusted under 35 U.S.C. 154(b) by 1478 days.

(21) Appl. No.: 11/826,457

(22) Filed: Jul. 16, 2007

(65) Prior Publication Data

US 2009/0024559 A1 Jan. 22, 2009

(51) Int. Cl.
*G06F 7/00* (2006.01)
*G06F 17/00* (2006.01)

(52) U.S. Cl.
USPC .......................................... 707/706; 707/758

(58) Field of Classification Search
None
See application file for complete search history.

(56) References Cited

U.S. PATENT DOCUMENTS

| | | | | |
|---|---|---|---|---|
| 7,720,436 B2* | 5/2010 | Hamynen et al. | ............ | 455/13.1 |
| 7,893,963 B2* | 2/2011 | Gallagher et al. | ......... | 348/208.6 |
| 2002/0091568 A1* | 7/2002 | Kraft et al. | ....................... | 705/14 |
| 2005/0162523 A1* | 7/2005 | Darrell et al. | ............... | 348/211.2 |
| 2006/0123053 A1* | 6/2006 | Scannell, Jr. | ................ | 707/104.1 |
| 2007/0027921 A1* | 2/2007 | Alvarado et al. | ........... | 707/104.1 |
| 2007/0156747 A1* | 7/2007 | Samuelson | .................... | 707/102 |
| 2007/0162942 A1* | 7/2007 | Hamynen et al. | .............. | 725/105 |
| 2007/0188653 A1* | 8/2007 | Pollock et al. | ................. | 348/373 |
| 2007/0266252 A1* | 11/2007 | Davis et al. | ..................... | 713/176 |
| 2007/0282907 A1* | 12/2007 | Chambers | ................... | 707/104.1 |
| 2007/0282908 A1* | 12/2007 | Van der Meulen et al. | ........................... | 707/104.1 |
| 2009/0024559 A1* | 1/2009 | Arrasvuori | ........................ | 707/1 |

* cited by examiner

*Primary Examiner* — Tony Mahmoudi
*Assistant Examiner* — Tuan A Pham
(74) *Attorney, Agent, or Firm* — Ditthavong Mori & Steiner, P.C.

(57) ABSTRACT

The invention allows location and other context based presentation of media content while capturing new content with a mobile device. First media content is captured with the mobile device located at a current location. A current context of the mobile device is determined. Second media content is retrieved based on the determined current context of the mobile device. Then, the captured first media content is presented concurrently with the retrieved second media content.

25 Claims, 4 Drawing Sheets

CONTEXT BASED MEDIA CONTENT PRESENTATION

BACKGROUND OF THE INVENTION

1. Field of the Invention

The invention generally relates to media and positioning services and also to context based media content presentation services.

2. Description of the Related Art

Lately, positioning services have become available for mobile telephones. For example, Global Positioning System (GPS) receivers are nowadays integrated more and more frequently into mobile telephones. Alternatively, a separate Global Positioning System receiver may often be connected wirelessly to a mobile telephone, for example via a Bluetooth connection.

Furthermore, during the last decade mobile telephones have developed from conventional telephones into multi-purpose entertainment devices with Internet access. For example, a mobile telephone may be provided with General Packet Radio Service (GPRS) or a Third Generation Partnership Project (3GPP) data connection that allow, for example, Internet access. Also, today a mobile telephone is often equipped with a color display large enough for browsing web pages comfortably.

The above described recent developments have allowed various new location based services to be provided to mobile subscribers.

For example, while browsing Internet with a mobile device web browser, it is known to display web page content (e.g. advertisements) that is customized in accordance with a current position of the mobile device, wherein the current position is provided e.g. by a GPS receiver arranged in connection with the mobile device.

However, there is a severe lack of position and other context based services and applications that utilize media production and reproduction means available in a typical modern mobile device. Today, a mobile telephone often has e.g. an integrated digital camera, at least one speaker of sufficient quality to be used for reproducing various audio clips, and the color display is often large enough for comfortably viewing video clips and images as well as for use as a viewfinder for the integrated digital camera. At the same time, a typical mobile telephone nowadays has enough processing power for processing various video and audio formats that often are highly compressed in order to save storage space and bandwidth. Yet, prior art fails to teach position and other context based media content services or applications. Yet, prior art further fails to teach position and other context based media content services or applications wherein prerecorded media content selected on context basis is reproduced simultaneously with live media content currently being captured at location with a mobile device.

SUMMARY OF THE INVENTION

A first aspect of the present invention is a method in which first media content is captured with a mobile device; a current context of the mobile device is determined; second media content is retrieving based on the determined current context of the mobile device; and the captured first media content is presented concurrently with the retrieved second media content.

A second aspect of the present invention is a mobile device that comprises a media content capturer configured to capture first media content; a context determiner configured to determine a current context of the mobile device; a media content retriever configured to retrieve second media content based on the determined current context of the mobile device; and a media presenter configured to present the captured first media content concurrently with the retrieved second media content.

A third aspect of the present invention is a computer program embodied on a computer readable medium, the computer program controlling a data processing device to perform: capturing first media content with a mobile device; determining a current context of the mobile device; retrieving second media content based on the determined current context of the mobile device; and presenting the captured first media content concurrently with the retrieved second media content.

A fourth aspect of the present invention is a mobile device that comprises a media content capturing means for capturing first media content; a context determining means for determining a current context of the mobile device; a media content retrieving means for retrieving second media content based on the determined current context of the mobile device; and a media presenting means for presenting the captured first media content concurrently with the retrieved second media content.

In an embodiment of the invention, the current context of the mobile device comprises at least current location information of the mobile device. The context determiner is configured to obtain the current location information of the mobile device. The current location information is obtained in the context determiner, for example, via a GPS receiver, via a mobile network based positioning service client such as a UMTS Location based Services (LCS) client or via cell or cell beam identifiers. The mobile network based positioning service may utilize a hyperbola method with a number of base stations. The position may be calculated, for example, in the context determiner or in another entity or unit within the mobile device, or at the request of the context determiner in a mobile network node.

In an embodiment of the invention, the current context of the mobile device further comprises at least one of current date, season at the current location, an identification of a user of the mobile device, orientation of the mobile device while capturing the first media content, and a zoom ratio of the mobile device while capturing the first media content.

In an embodiment of the invention, the current context of the mobile device further comprises information about second media content consumption by a user of the mobile device, the consumption having been monitored over a period of time.

In an embodiment of the invention, the second media content is retrieved over a wireless link from a media database arranged in a data network.

In an embodiment of the invention, the second media content is retrieved from a media storage arranged in the mobile device.

In an embodiment of the invention, the second media content is retrieved by retrieving at least one piece of the second media content pre-associated with the current context of the mobile device.

In an embodiment of the invention, the captured first media content is displayed in a first portion of a split display and the retrieved second media content is displayed in a second portion of the split display.

In an embodiment of the invention, the retrieved second media content and the captured first media content are displayed using at least one overlay.

In an embodiment of the invention, the first media content is captured by capturing a current view with a digital camera included in the mobile device.

In an embodiment of the invention, the second media content comprises at least one of a video clip, an audio clip, and an image.

It is to be understood that the aspects and embodiments of the invention described above may be used in any combination with each other. Several of the aspects and embodiments may be combined together to form a further embodiment of the invention. A method, a mobile device, or a computer program which is an aspect of the invention may comprise at least one of the embodiments of the invention described above.

The invention allows position and other context based media services wherein prerecorded media content selected on context basis is reproduced simultaneously with live media content currently being captured at location with a mobile device.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the invention, examples of which are illustrated in the accompanying drawings.

Figure 1A:
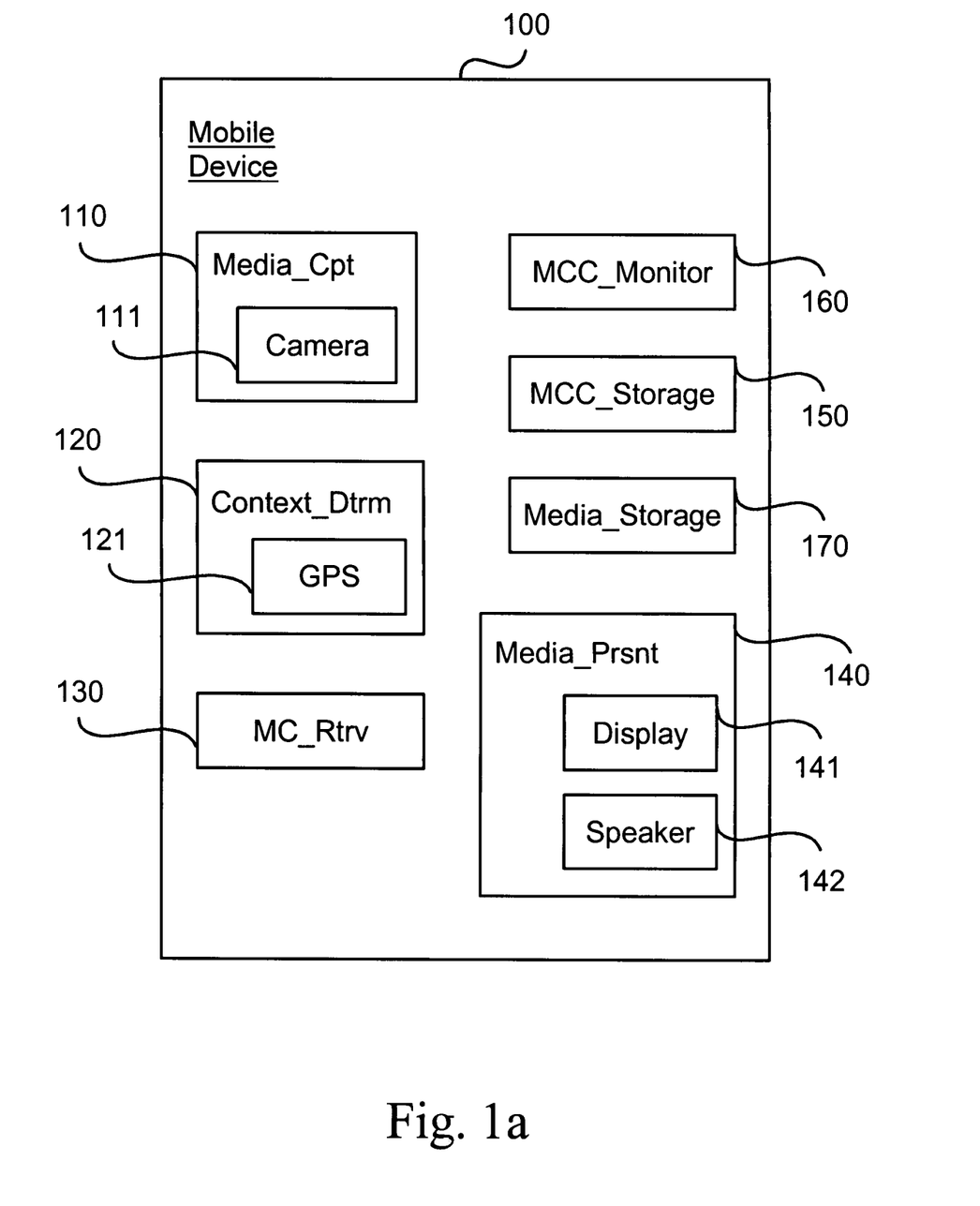
FIG. 1a is a block diagram illustrating a mobile device according to an embodiment of the invention.

FIG. 1a is a block diagram illustrating a mobile device 100 according to an embodiment of the invention. In the embodiment of the invention illustrated in FIG. 1a, the various elements of the invention have been arranged in the mobile device 100. However, as will be described in reference to FIG. 1b describing one embodiment of the invention, some of the elements of the invention may be distributed e.g. on a data communications network. The mobile device 100—as well as a mobile device 101 illustrated in FIG. 1b—may be e.g. a mobile telephone, a smart phone, a personal digital assistant, a portable computer, a mobile communication device, an audio/video player, a digital camera/camcorder, a positioning device such as a GPS device (Global Positioning System), a mobile TV, or the like, or any combination of the aforementioned.

The mobile device 100 illustrated in FIG. 1a comprises a media content capturer 110 that is configured to capture first media content at a current location of the mobile device 100. The media content capturer 110 may comprise a digital camera 111 that is configured to perform the capturing of the first media content by capturing a current view at the current location of the mobile device 100. In other words, the first media content is typically live video stream captured by a user of the mobile device 100 with the digital camera 111. However, the first media content need not necessarily be live. For example, the first media content may be captured first and viewed later. Furthermore, the first media content need not necessarily be video stream. Rather, the first media content may be, for example, one or more still images.

As is known in the art, a mobile device equipped with a digital camera typically comprises a display screen that can be used as a viewfinder for the digital camera. Such is the case with the present invention also: a media presenter 140 and an included display 141 may be used as a viewfinder with which the user may view the first media content as it is being captured.

It is to be understood that the digital camera 111 need not necessarily be physically integrated in the mobile device 100. Rather, the digital camera 111 may be a physically separate device (not illustrated) communicating with the mobile device 100 in a suitable manner, e.g. via a Bluetooth connection (not illustrated).

The mobile device 100 illustrated in FIG. 1a further comprises a context determiner 120 configured to determine a current context of the mobile device 100, wherein the current context includes at least the current location of the mobile device 100. It is to be understood that herein the term "current" is used to refer to "at the time of capturing the first media content".

The current context of the mobile device 100 may further comprise at least one of current date, season at the current location, an identification of a user of the mobile device 100, orientation of the mobile device 100 while capturing the first media content, and a zoom ratio of the mobile device 100 (or, more specifically, a zoom ratio of the digital camera 111) while capturing the first media content. Furthermore, as will be described in more detail below, the mobile device 100 may be provided information about information about past second media content consumption of the user of the mobile device 100 over a period of time in which case this information may also be included in the current context of the mobile device 100.

As illustrated in FIG. 1a, the context determiner 120 may comprise a Global Positioning System (GPS) receiver 121 configured to provide the current location of the mobile device 100. Alternatively, the current location of the mobile device 100 may be determined with positioning via Cell Identification or positioning via access point, both of which are procedures known to those skilled in the art and thus not described in more detail.

The orientation of the mobile device 100 may include a direction the mobile device 100 and particularly the digital camera 111 is pointed at while capturing the first media content. Furthermore, the orientation of the mobile device 100 may include an alignment the mobile device 100 and particularly the digital camera 111 is tilted at while capturing the first media content. The direction may be determined e.g. with an electronic compass (not illustrated) that the context determiner 120 may be provided with. The alignment may be determined e.g. with a suitable sensor device (not illustrated) that the context determiner 120 may be provided with.

Furthermore, the digital camera 111 may be configured to register its zoom ratio in order to provide the zoom ratio to the context determiner 120. The identification of the user of the mobile device 100 may be e.g. a telephony subscriber identification of the user in case the mobile device 100 is a mobile telephone. Alternatively, the identification of the user may be e.g. an identification generated and used specifically for the context based media content presentation of the invention.

The embodiment of the mobile device 100 illustrated in FIG. 1a further comprises a media storage 170 (e.g. a database) configured to store second media content. The second media content may comprise e.g. video clips, audio clips, and still images. Various pieces of the second media content are each pre-associated with at least one context. For example, a video clip (such as a movie scene) showing a given tourist attraction may have been pre-associated with location coordinates (e.g. GPS coordinates) of the respective tourist attraction. Furthermore, there may be several video clips of the same given tourist attraction, each taken e.g. at a different season. In this case, each video clip may have been pre-associated with the respective season as well as the location coordinates. Similarly, there may be several video clips of the same given tourist attraction, each taken e.g. at a different tilt angle or direction. In this case, each video clip may have been pre-associated with the respective tilt angle or direction as well as the location coordinates. As another example, a piece of music from a movie scene may have been pre-associated with coordinates of the location the respective movie scene takes place in. As yet another example, a photograph or an image (e.g. a scanned image) of a newspaper article may have been pre-associated with coordinates of the location the respective photograph is taken of or of the location that is the subject of the respective newspaper article.

The pre-association of the pieces of the second media content with context may be implemented e.g. with metadata sections arranged in the second media content files. For existing second media content, this pre-association may be performed afterwards, e.g. manually. However, when creating new second media content, the context information may be stored in the new second media content as it is being created.

The embodiment of the mobile device 100 illustrated in FIG. 1a further comprises a media content consumption monitor 160 that is configured to monitor the second media content consumption of the user of the mobile device 100 over a period of time. Furthermore, the embodiment of the mobile device 100 illustrated in FIG. 1a comprises a media content consumption storage 150 that is configured to store information (e.g. a log file) about the monitored second media content consumption of the user. Thus, the media content consumption monitor 160 and the media content consumption storage 150 allow the user's media content consumption history to be known. This history can subsequently be utilized in determining which piece(s) of the second media content to select for current presentation, as will be described below.

The mobile device 100 illustrated in FIG. 1a further comprises a media content retriever 130 that is configured to retrieve second media content based on the determined current context of the mobile device 100. The second media content based will be retrieved from the media storage 170 in which various pieces of the second media content, each pre-associated with at least one context, have been stored beforehand. The second media content will be retrieved based on the determined current context of the mobile device 100. That is, the determined current context may be transferred to the media storage 170 after which a search is performed at the media storage 170 for such a piece(s) of the second media content that has been pre-associated with a context corresponding to the determined current context. Alternatively, the search may be performed directly from media content retriever 130. For example, in case the first media content depicts a given tourist attraction at a given location, the media storage 170 may be searched for second media content pre-associated with this location. Such second media content may be e.g. video clips from movie scenes depicting the same given tourist attraction.

Figure 3:
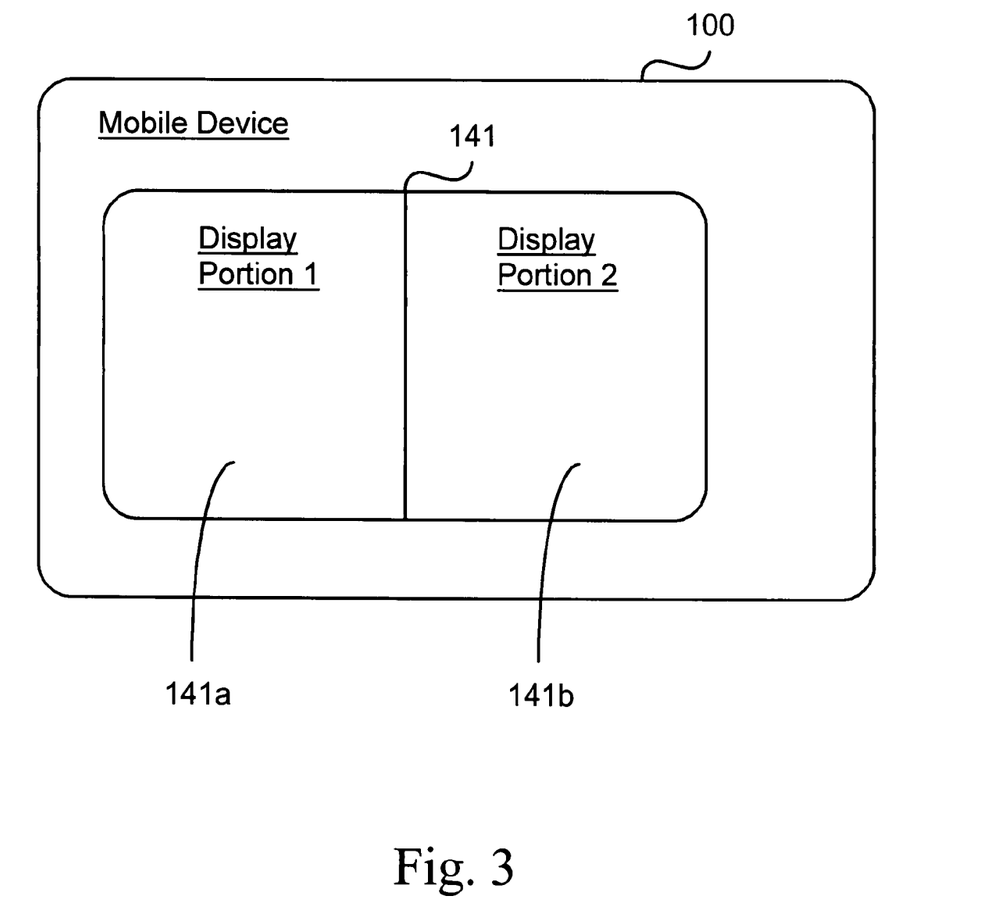
FIG. 3 is a block diagram illustrating a split display arrangement utilized in a mobile device according to an embodiment of the invention.

The mobile device 100 illustrated in FIG. 1a further comprises a media presenter 140 configured to present the captured first media content concurrently with the retrieved second media content. In the embodiment of the mobile device 100 illustrated in FIG. 1a, the media presenter 140 further comprises the display 141 and a speaker 142. The concurrent presentation may be achieved e.g. via a split display. FIG. 3, which describes one embodiment of the invention, illustrates an example of a split display. The display 141 comprises a first display portion 141a and a second display portion 141b. The captured first media content may be presented e.g. on the first display portion 141a, and simultaneously the retrieved second media content may be presented e.g. on the second display portion 141b, thus resulting in both the first media content and the second media content being presented concurrently. It is to be understood that the display screen 141 need not be physically divided into separate portions. Rather, the first display portion 141a and the second display portion 141b may be implemented via presentation software that displays the first media content and the second media content in different portions of the display screen 141. Furthermore, it is to be understood that the first display portion 141a and the second display portion 141b need not necessarily be shaped as in the example of FIG. 3. For example, the second display portion 141b may be a window inside the first display portion 141a, or vice versa. As another example, the concurrent presentation may be achieved e.g. via one or more overlays. For example, the retrieved second media content may be overlaid on top of the captured first media content, or vice versa. Preferably, in this case the overlaid media content would be partially transparent to allow simultaneous viewing of both media contents.

Figure 1B:
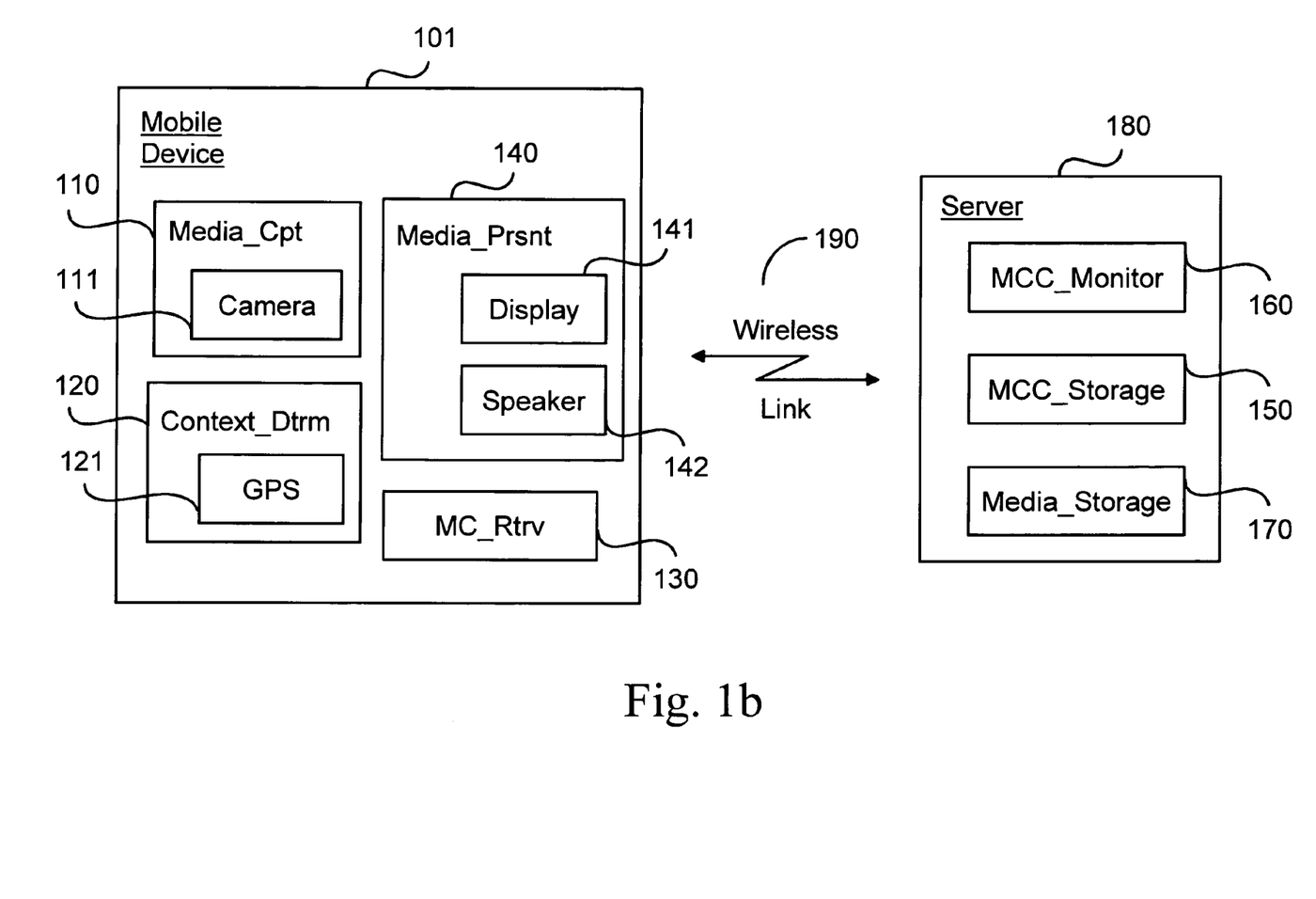
FIG. 1b is a block diagram illustrating another mobile device and a server according to an embodiment of the invention.

FIG. 1b is a block diagram illustrating a mobile device 101 according to another embodiment of the invention. The embodiment of FIG. 1b differs from the embodiment of FIG. 1a in the disposition of the various elements 110 to 170. More specifically, rather than arranged in the mobile device 101, the media content consumption storage 150, the media content consumption monitor 160, and the media storage 170 are now distributed in a server 180.

The functionality of the elements 110 to 170 in the embodiment of FIG. 1b is similar to that of the elements 110 to 170 in the embodiment of FIG. 1a. Thus, it is not described again here.

The server 180 may be arranged in a data network (not illustrated), such as the Internet, in a manner known to those skilled in the art. The mobile device 101 and the server 180 communicate via a wireless link 190 that may comprise e.g. a mobile telecommunications network with data transfer means, such as a General Packet Radio Service (GPRS) or Third Generation Partnership Project (3GPP) data link. Alternatively, the wireless link 190 may comprise e.g. a Wireless Local Area Network (WLAN) link.

It is to be understood that not all of the media content consumption storage 150, the media content consumption monitor 160, and the media storage 170 need to be arranged in the single server 180, however. For example, one or two of the media content consumption storage 150, the media content consumption monitor 160, and the media storage 170 may be arranged in some other network element(s), such as another server (not illustrated). Alternatively, one or two of the media content consumption storage 150, the media content consumption monitor 160, and the media storage 170 may be left in the mobile device 101 while the rest are distributed into the server 180.

Figure 2:
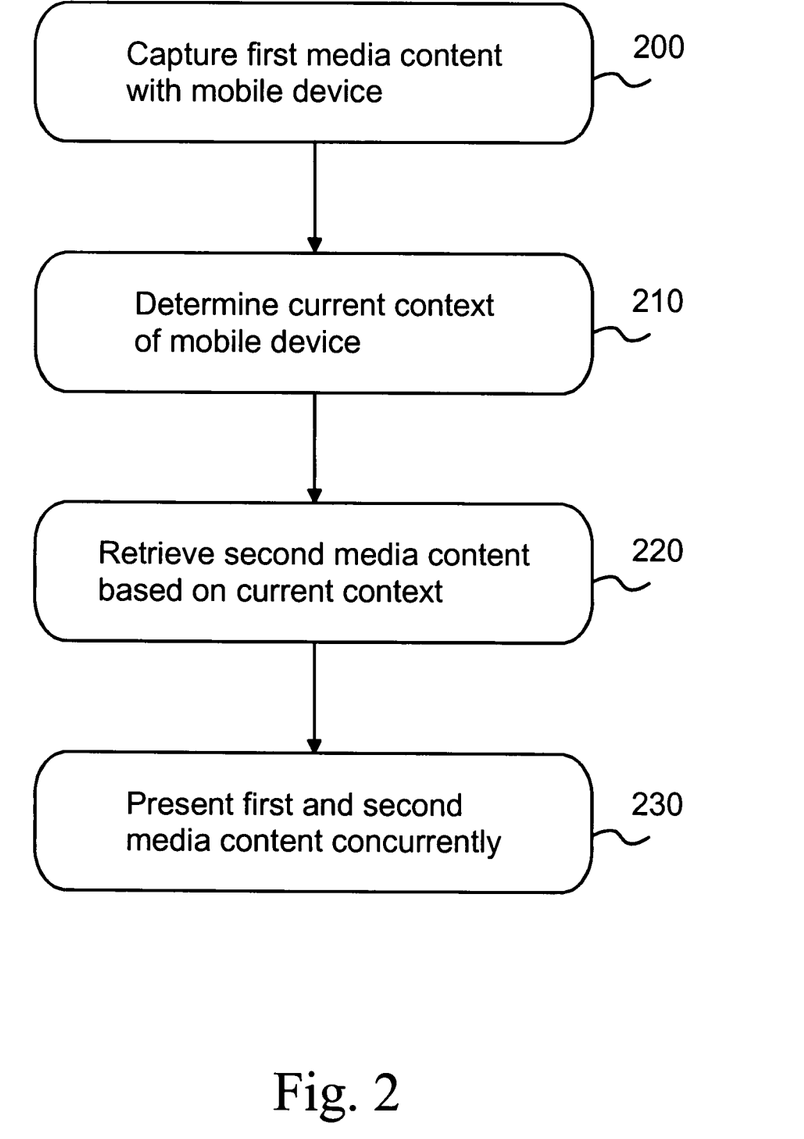
FIG. 2 is a flow diagram illustrating a method according to an embodiment of the invention.

FIG. 2 is a flow diagram illustrating a method according to an embodiment of the invention. At step 200, the first media content is captured with the mobile device located at the current location. The current context of the mobile device including the current location of the mobile device is determined, step 210. At step 220, the second media content is retrieved based on the determined current context of the mobile device. At step 230, the captured first media content is presented concurrently with the retrieved second media content.

The retrieving of the second media content at step 220 may be performed automatically or it may be performed only when requested by the user.

Furthermore, if there are found several pieces of the second media content that correspond to the captured first media content, the user may be presented with a list of the found pieces before the media content presentation of step 230 to allow the user to select the piece to be subsequently presented at step 230.

Furthermore, in one embodiment of the invention, the user may first register with the media storage 170. This allows e.g. invoicing the user's media storage account in response to a piece of the second media content sent to the user.

The exemplary embodiments can include, for example, any suitable mobile devices, smart phones, personal digital assistants, laptop computers, servers, mobile communication devices, audio/video players, digital cameras/camcorders, positioning devices such as a GPS device (Global Positioning System), mobile TV sets, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, 3G communications networks, Public Switched Telephone Network (PSTNs), Packet Data Networks (PDNs), Bluetooth, WLAN (Wireless LAN), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. Further, the exemplary embodiments can be implemented on the World Wide Web. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDR, CD-RW, DVD, DVD-ROM, DVD±RW, DVD±R, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

What is claimed is:

1. A method, comprising:
    capturing a live first media content with a digital camera included in a mobile device at a current location, the mobile device being a personal portable mobile communication device, said first media content including image data;
    determining a current context of the mobile device, the current context including at least current location coordinates of the mobile device and orientation of a viewfinder of the camera while capturing the first media content, the orientation of the viewfinder being defined by a tilt angle of the camera;
    retrieving a second media content based on the determined current context of the mobile device, said second media content including image data; and
    presenting on a display of the mobile device the captured first media content concurrently with the retrieved second media content,
    wherein the first and second media content have the same location coordinates and the same orientation of a respective camera while capturing the media content.

2. The method according to claim 1, wherein the orientation of the viewfinder of the camera is determined with an electronic compass or a sensor device.

3. The method according to claim 1, wherein the current context of the mobile device further comprises at least one of current date, season at the current location, an identification of a user of the mobile device, and a zoom ratio of the mobile device while capturing the first media content,
    wherein the first and second media content have the same identification of the user of the mobile device.

4. The method according to claim 3, wherein the identification of the user of the mobile device includes a telephony subscriber identification.

5. The method according to claim 1, further comprising: utilizing a media content consumption history of a user to determine which one or more pieces of second media content to present to the user, wherein the current context of the mobile device further comprises the media content consumption history including second media content consumption by the user of the mobile device, the consumption having been monitored over a period of time.

6. The method according to claim 1, wherein the retrieving of the second media content is performed by retrieving the second media content over a wireless link from a media database arranged in a data network.

7. The method according to claim 1, wherein the retrieving of the second media content is performed by retrieving the second media content from a media storage arranged in the mobile device.

8. The method according to claim 1, wherein the retrieving of the second media content is performed by retrieving at least one piece of the second media content pre-associated with the current context of the mobile device.

9. The method according to claim 1, wherein the presenting of the captured first media content concurrently with the retrieved second media content is performed by concurrently displaying the captured first media content in a first portion of a split display and the retrieved second media content in a second portion of the split display.

10. The method according to claim 1, wherein the presenting of the captured first media content concurrently with the retrieved second media content is performed by concurrently displaying the retrieved second media content and the captured first media content using at least one overlay.

11. The method according to claim 1, wherein the first media content depicts a given tourist attraction at a given location, and the second media content includes at least one of a scanned newspaper article image depicting the tourist attraction, an audio clip from a movie scene depicting the tourist attraction, and a video clip from a movie scene depicting the tourist attraction.

12. The method according to claim 1, wherein the second media content comprises at least one of a video clip, an audio clip, and an image.

13. A mobile device, comprising:
    at least one processor; and
    at least one memory including computer program code,
    the at least one memory and the computer program code configured to, with the at least one processor, cause the mobile device to perform at least the following,
    capture a live first media content with a digital camera included in the mobile device at a current location, said first media content including image data;
    determine a current context of the mobile device, the current context including at least current location coordinates of the mobile device and orientation of a viewfinder of the camera while capturing the first media content, the orientation of the viewfinder being defined by a tilt angle of the camera;
    retrieve a second media content based on the determined current context of the mobile device, said second media content including image data; and
    present on a display of the mobile device the captured first media content concurrently with the retrieved second media content,
    wherein the mobile device is a personal portable mobile communication device, and
    the first and second media content have the same location coordinates and the same orientation of a respective camera while capturing the media content.

14. The mobile device according to claim 13, wherein the orientation of the viewfinder of the camera is determined with an electronic compass or a sensor device.

15. The mobile device according to claim 13, wherein the current context of the mobile device further comprises at least one of current date, season at the current location, an identification of a user of the mobile device, and a zoom ratio of the mobile device while capturing the first media content,
    wherein the first and second media content have the same identification of the user of the mobile device.

16. The mobile device according to claim 13, wherein the mobile device is further caused to utilize a media content consumption history of a user to determine which one or more pieces of second media content to present to the user,
    wherein the current context of the mobile device further comprises the media content consumption history including the second media content consumption by the user of the mobile device, the consumption having been monitored over a period of time.

17. The mobile device according to claim 16, wherein the mobile device is further caused to receive the information about second media content consumption from a media content consumption monitor monitoring the second media content consumption of the user of the mobile device.

18. The mobile device according to claim 13, wherein the mobile device is further caused to perform the retrieving of the second media content by retrieving the second media content over a wireless link from a media database arranged in a data network.

19. The mobile device according to claim 13, wherein the mobile device is further caused to perform the retrieving of the second media content by retrieving the second media content from an internal media storage.

20. The mobile device according to claim 13, wherein the mobile device is further caused to perform the retrieving of the second media content by retrieving at least one piece of the second media content pre-associated with the current context of the mobile device.

21. The mobile device according to claim 13, wherein the mobile device is further caused to perform the presenting of the captured first media content concurrently with the retrieved second media content by concurrently displaying the captured first media content in a first portion of a split display and the retrieved second media content in a second portion of the split display.

22. The mobile device according to claim 13, wherein the mobile device is further caused to perform the presenting of the captured first media content concurrently with the retrieved second media content by concurrently displaying the retrieved second media content and the captured first media content using at least one overlay.

23. The mobile device according to claim 13, wherein the first media content depicts a given tourist attraction at a given location, and the second media content includes at least one of a scanned newspaper article image depicting the tourist attraction, an audio clip from a movie scene depicting the tourist attraction, and a video clip from a movie scene depicting the tourist attraction.

24. The mobile device according to claim 13, wherein the second media content comprises at least one of a video clip, an audio clip, and an image.

25. A non-transitory computer readable storage medium carrying one or more sequences of one or more instructions which, when executed by one or more processors, cause a mobile device to at least perform the following steps,
   capturing a live first media content with a digital camera included in the mobile device at a current location, said first media content including image data;
   determining a current context of the mobile device, the current context including at least current location coordinates of the mobile device and orientation of a viewfinder of the camera while capturing the first media content, the orientation of the viewfinder being defined by a tilt angle of the camera;
   retrieving a second media content based on the determined current context of the mobile device, said second media content including image data; and
   presenting on a display of the mobile device the captured first media content concurrently with the retrieved second media content,
   wherein the mobile device being a personal portable mobile communication device, and
   the first and second media content have the same location coordinates and the same orientation of a respective camera while capturing the media content.

* * * * *